US012706012B2

(12) United States Patent
Pyo

(10) Patent No.: US 12,706,012 B2
(45) Date of Patent: Aug. 11, 2026

(54) DISPLAY DEVICE AND METHOD OF DRIVING DISPLAY DEVICE

(71) Applicant: Samsung Display Co., LTD., Yongin-si (KR)

(72) Inventor: Si Beak Pyo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/943,138

(22) Filed: Nov. 11, 2024

(65) Prior Publication Data

US 2025/0308422 A1 Oct. 2, 2025

(30) Foreign Application Priority Data

Mar. 26, 2024 (KR) ........................ 10-2024-0041090

(51) Int. Cl.
*G09G 3/20* (2006.01)

(52) U.S. Cl.
CPC ....... *G09G 3/20* (2013.01); *G09G 2300/0819* (2013.01); *G09G 2300/0842* (2013.01); *G09G 2300/0861* (2013.01); *G09G 2360/144* (2013.01)

(58) Field of Classification Search
CPC ............. G09G 2360/16; G09G 3/3233; G09G 2320/0626; G09G 2330/028
See application file for complete search history.

(56) References Cited

U.S. PATENT DOCUMENTS

| | | | | |
|---|---|---|---|---|
| 10,930,208 | B2 | 2/2021 | Pyo et al. | |
| 11,322,075 | B2 | 5/2022 | Pyo et al. | |
| 11,600,217 | B2 | 3/2023 | Pyo et al. | |
| 11,699,379 | B2 | 7/2023 | Pyo | |
| 11,935,490 | B2 | 3/2024 | Pyo et al. | |
| 2012/0280970 | A1* | 11/2012 | Kato | G09G 3/3291 345/212 |
| 2012/0327067 | A1* | 12/2012 | Kato | G09G 3/3258 345/212 |
| 2017/0004779 | A1* | 1/2017 | Novoselov | G09G 3/2007 |
| 2017/0193913 | A1* | 7/2017 | Lee | G09G 3/3258 |
| 2021/0225287 | A1* | 7/2021 | Meng | G09G 3/3291 |
| 2024/0021115 | A1* | 1/2024 | Yamada | G01K 3/06 |
| 2024/0404445 | A1* | 12/2024 | Young | G09G 3/2003 |

FOREIGN PATENT DOCUMENTS

| | | | |
|---|---|---|---|
| CN | 111724731 | A | 9/2020 |
| CN | 113053294 | A | 6/2021 |
| CN | 115810329 | A | 3/2023 |

* cited by examiner

*Primary Examiner* — Van N Chow
(74) *Attorney, Agent, or Firm* — CANTOR COLBURN LLP

(57) ABSTRACT

A display device includes a display panel including a pixel, a voltage generator for generating a plurality of driving voltages, an illuminance sensor for sensing an amount of ambient light of the display panel and generating a sensing value corresponding to a sensing result, and a driver for generating a data signal transferred to the pixel. The driver controls the voltage generator to change at least one driving voltage among the plurality of driving voltages, based on the sensing value.

17 Claims, 8 Drawing Sheets

DISPLAY DEVICE AND METHOD OF DRIVING DISPLAY DEVICE

The application claims priority to Korean patent application No. 10-2024-0041090, filed on Mar. 26, 2024, and all the benefits accruing therefrom under 35 U.S.C. § 119, the content of which in its entirety is herein incorporated by reference.

BACKGROUND

1. Technical Field

The present disclosure generally relates to a display device and a method of driving a display device.

2. Related Art

With the development of information technologies, the importance of a display device which is a connection medium between a user and information increases. Accordingly, display devices such as a liquid crystal display device and an organic light emitting display device are increasingly used.

When a display device is used outdoors instead of indoors, a driving voltage may be influenced by ultraviolet light incident into a display panel in the display device. Specifically, as the intensity of the ultraviolet light incident into the display panel becomes stronger, the driving voltage used in the display device may increase. This may have influence on the image quality of the display device.

SUMMARY

Embodiments provide a display device capable of compensating for a driving voltage changed according to external illuminance.

Embodiments also provide a method of driving a display device, which can compensate for a driving voltage changed according to external illuminance.

In accordance with an aspect of the present disclosure, there is provided a display device including: a display panel including a pixel; a voltage generator configured to generate a plurality of driving voltages; an illuminance sensor configured to sense an amount of ambient light of the display panel, and generate a sensing value corresponding to a sensing result; and a driver configured to generate a data signal transferred to the pixel, where the driver controls the voltage generator to change at least one driving voltage among the plurality of driving voltages, based on the sensing value.

The display device may further include a memory configured to store a driving lookup table. The driver may include a controller configured to generate a first offset value corresponding to the sensing value with reference to the driving lookup table, and provide the first offset value to the voltage generator.

The pixel may include: a pixel circuit connected to a line configured to supply a first power voltage; and a light emitting element connected between the pixel circuit and a line configured to supply a second power voltage. The voltage generator may generate the second power voltage, using the first offset value.

The voltage generator may generate the second power voltage by adding the first offset value to an initial second power voltage.

The pixel circuit may include at least one P-type transistor. The voltage generator may generate a voltage supplied to a gate of the at least one P-type transistor and for turning on the at least one P-type transistor, using the first offset value.

The pixel circuit may include at least one N-type transistor. The voltage generator may generate a voltage supplied to a gate of the at least one N-type transistor and for turning off the at least one N-type transistor, using the first offset value.

The controller may receive first image data, and generates second image data, based on the first image data. The driver may further include: a data converter configured to receive the second image data, and generate a voltage value corresponding to the second image data; and a data driver connected to the pixel through a data line, the data driver generating the data signal, which corresponds to the voltage value, and supplying the generated data signal to the data line. The controller may generate a second offset value corresponding to the sensing value with reference to the driving lookup table, and provide the second offset value to the voltage generator.

The pixel may include: a pixel circuit connected to a line configured to supply a first power voltage; and a light emitting element connected between the pixel circuit and a line configured to supply a second power voltage. The pixel circuit may include at least one N-type transistor. The voltage generator may generate a voltage supplied to a gate of the at least one N-type transistor and for turning on the at least one N-type transistor, using the second offset value.

The pixel may include: a pixel circuit connected to a line configured to supply a first power voltage; and a light emitting element connected between the pixel circuit and a line configured to supply a second power voltage. The pixel circuit may include at least one P-type transistor. The voltage generator may generate a voltage supplied to a gate of the at least one P-type transistor and for turning off the at least one P-type transistor, using the second offset value.

The voltage generator may generate a driving voltage of an operational amplifier included in the data driver, using the second offset value.

The memory may further store a plurality of gamma lookup tables. The data converter may generate the voltage value, using a gamma lookup table corresponding to the sensing value among the plurality of gamma lookup tables.

In accordance with another aspect of the present disclosure, there is provided a method of driving a display device, the method including: generating, by an illuminance sensor, a sensing value; determining at least one offset value corresponding to the sensing value with reference to a driving lookup table; generating at least one driving voltage, based on the offset value; and displaying an image, using the driving voltage.

In the generating of the at least one driving voltage, a smaller voltage as the driving voltage may be generated as the sensing value indicates a higher illuminance.

The generating of the at least one driving voltage, based on the offset value, may include generating a power voltage supplied to a pixel of the display device, based on the offset value.

The generating of the at least one driving voltage, based on the offset value, may include generating a voltage supplied to a gate of a P-type transistor included in a pixel of the display device, based on the offset value.

The generating of the at least one driving voltage, based on the offset value, may include generating a voltage supplied to a gate of an N-type transistor included in a pixel of the display device, based on the offset value.

The generating of the at least one driving voltage, based on the offset value, may include generating a driving voltage of an operational amplifier included in a data driver configured to generate a data signal to be supplied to a data line connected to a pixel of the display device, based on the offset value.

In accordance with still another aspect of the present disclosure, there is provided a method of driving a display device, the method including: generating, by an illuminance sensor, a sensing value; determining at least one offset value and a gamma lookup table, which correspond to the sensing value, with reference to a driving lookup table; generating at least one driving voltage, based on the offset value; generating a voltage value corresponding to input image data, using the gamma lookup table; and displaying an image, using the driving voltage and the voltage value.

In the generating of the at least one driving voltage, a smaller voltage as the driving voltage may be generated as the sensing value indicates a higher illuminance.

The generating of the at least one driving voltage, based on the offset value, may include generating a power voltage supplied to a pixel of the display device, based on the offset value.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
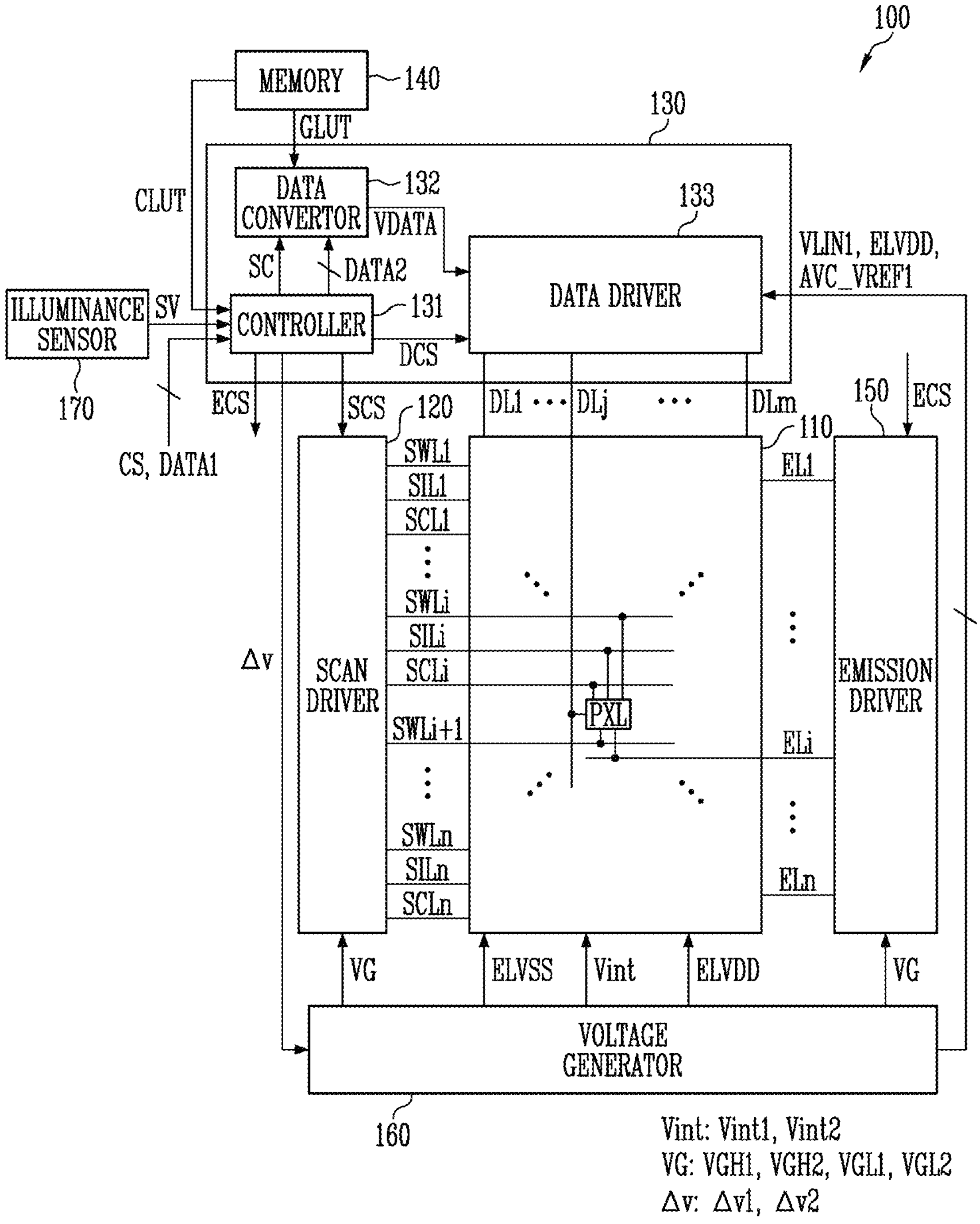
FIG. 1 is a block diagram illustrating a display device in accordance with an embodiment of the present disclosure.

The present disclosure may apply various changes and different shape, therefore only illustrate in details with particular examples. However, the examples do not limit to certain shapes but apply to all the change and equivalent material and replacement. The drawings included are illustrated a fashion where the figures are expanded for the better understanding.

It will be understood that, although the terms "first", "second," etc. may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

Hereinafter, a display device in accordance with an embodiment of the present disclosure will be described with reference to the accompanying drawings.

FIG. 1 is a block diagram illustrating a display device in accordance with an embodiment of the present disclosure.

Referring to FIG. 1, the display device 100 may include a display unit 110 (or display panel), a scan driver 120, a driver 130, a memory 140 (or storage unit), an emission driver 150, a voltage generator 160 (or power supply), and an illuminance sensor 170.

The display unit 110 may include scan lines SIL1 to SILn, SCL1 to SCLn, and SWL1 to SWLn (n is a positive integer), data lines DL1 to DLm (m is a positive integer), emission control lines EL1 to ELn, and pixels PXL. The pixels PXL may be disposed in areas defined by the scan lines SIL1 to SILn, SCL1 to SCLn, and SWL1 to SWLn, the data lines DL1 to DLm, and the emission control lines EL1 to ELn.

Each pixel PXL may be connected to one of the scan lines SIL1 to SILn, one of the scan lines SCL1 to SCLn, at least one of the scan lines SWL1 to SWLn, one of the data lines DL1 to DLm, and one of the emission control lines EL1 to ELn. For example, a pixel PXL located on an i-th row and a j-th column may be connected to i-th scan lines SILi, SCLi, and SWLi, an (i+1)th scan line SWLi+1, a j-th data line DLj, and an i-th emission control line ELi (each of i and j is a positive integer).

The pixel PXL may store or record a data signal (or data voltage) provided through the j-th data line DLj in response to a scan signal provided through the i-th scan line SWLi, and emit light with a luminance corresponding to the stored data signal in response to an emission control signal provided through the i-th emission control line ELi. The pixel PXL will be described later with reference to FIG. 2.

The scan driver 120 may generate a scan signal, based on a scan control signal SCS, and sequentially provide the scan signal to the scan lines SIL1 to SILn, SCL1 to SCLn, and SWL1 to SWLn. The scan control signal SCS may include a start signal, clock signals, and the like, and be provided from the driver 130. For example, the scan driver 120 may include a shift register which sequentially outputs a scan signal corresponding to the start signal in a pulse form, using the clock signals.

The scan driver 120 may be formed in the display unit 110 through the same process as a process of forming the pixel PXL, or be implemented as a separate integrated circuit.

The emission driver 150 may generate an emission control signal, based on an emission driving control signal ECS, and sequentially or simultaneously provide the emission control signal to the emission control lines EL1 to ELn. The emission driving control signal ECS may include an emission start signal, emission clock signals, and the like, and be provided from the driver 130. For example, the emission driver 150 may include a shift register which sequentially outputs an emission control signal corresponding to an emission start signal in a pulse form, using the emission clock signals.

The driver 130 may generate data signals, based on input image data DATA1 and a control signal CS, which are provided from the outside (e.g., a graphic processor).

The driver 130 may include a controller 131 (or timing controller), a data converter 132, and a data driver 133. The controller 131, the data converter 132, and the data driver 133 may be implemented into one integrated circuit. However, this is merely illustrative, and the present disclosure is not limited thereto. For another example, the controller 131 may include the data converter 132, to be implemented as one integrated circuit, and the data driver 133 may be implemented as an integrated circuit independent from the controller 131.

The controller 131 may receive the input image data DATA1 and the control signal CS from the outside, generate the scan control signal SCS and a data control signal DCS, based on the control signal CS, and generate image data DATA2 by converting the input image data DATA1. The control signal CS may include a vertical synchronization signal, a horizontal synchronization signal, a clock, and the like. For example, the controller 131 may convert the input image data DATA1 in an RGB format into the image data DATA2 in an RGBG format, which accords with a pixel arranged in the display unit 110.

The data converter 132 may convert an input grayscale value included in the image data DATA2 into a voltage value VDATA, using a gamma lookup table GLUT. The gamma lookup table GLUT may include voltage values VDATA corresponding to input grayscale values. The gamma lookup table GLUT may be provided to the data converter 132 from the memory 140.

The data driver 133 may generate data signals, based on the data control signal DCS provided from the controller 131 and the voltage value VDATA provided from the data converter 132, and provide the data signals to the display unit 110 (or the pixels PXL). The data control signal DCS may be a signal for controlling an operation of the data driver 133, and include a load signal (or data enable signal) indicating an output of a valid data signal, and the like.

For example, the data driver 133 may be configured to include a shift register, a latch, a decoder, an output buffer, and the like. The data driver 133 may sequentially provide or arbitrarily store the voltage value VDATA to the shift register and the latch, based on the data control signal DCS, and output a data signal corresponding to the voltage value VDATA to a data line through the decoder.

The memory 140 may store the gamma lookup table GLUT. For example, the memory 140 may be implemented as a flash memory, and be mounted on a flexible circuit board on which the driver 130 is mounted, to be connected to the driver 130 (e.g., the data converter 132).

The memory 140 may also store a driving lookup table CLUT. The driving lookup table CLUT may be transferred to the controller 131.

The voltage generator 160 may supply first and second power voltages ELVDD and ELVSS. The first and second power voltages ELVDD and ELVSS are voltages for an operation of the pixel PXL, and the first power voltage ELVDD may have a voltage level higher than a voltage level of the second power voltage ELVSS. In addition, an initialization power voltage Vint may be provided to the display unit 110. The initialization power voltage Vint may be provided to the display unit 110 from the voltage generator 160 through the driver 130 (e.g., the data driver 133). In an example, the initialization power voltage Vint may include a first initialization power voltage Vint1 and a second initialization power voltage Vint2.

Also, the voltage generator 160 may supply a gate voltage VG to the scan driver 120 and the emission driver 150. The gate voltage VG may be a voltage input to gates of transistors included in the pixel PXL in the display device 100. Exemplarily, the gate voltage VG may include a first high voltage VGH1, a first low voltage VGL1, a second high voltage VGH2, and a second low voltage VGL2. The first high voltage VGH1 may be a voltage for turning off a P-type transistor included in the pixel PXL. The first low voltage VGL1 may be a voltage for turning on the P-type transistor included in the pixel PXL. The second high voltage VGH2 may be a voltage for turning on an N-type transistor included in the pixel PXL. The second low voltage VGL2 may be a voltage for turning off the N-type transistor included in the pixel PXL.

Additionally, the voltage generator 160 may supply the first power voltage ELVDD and voltages VLIN1 and AVC_VREF1 to the data driver 133. The voltage VLIN1 may be a voltage for driving an operational amplifier included in the data driver 133. In an embodiment, the voltage AVC_VREF1 may be a black grayscale voltage.

The illuminance sensor 170 may sense an illuminance at the ambient area of the display device 100, and generate a sensing value SV corresponding to a sensing result. The sensing value SV may be transferred to the controller 131 of the driver 130.

According to the display device 100 in accordance with the embodiment of the present disclosure, the driver 130 may receive a sensing value SV from the illuminance sensor 170, and control an operation of the voltage generator 160, based on the received sensing value SV. Specifically, the driver 130 may determine an offset value Δv with reference to the driving lookup table CLUT received from the memory 140. In an embodiment, the offset value Δv may include a first offset value Δv1 and a second offset value Δv2. The offset value Δv may be a value for changing a value of at least one of voltages generated by the voltage generator 160. The voltage generator 160 may change a value of at least one of voltages generated based on the determined offset value Δv.

As described above, when a display device is used outdoors instead of indoors, a driving voltage may be influenced by ultraviolet light incident into a display panel in the display device. Specifically, as the intensity of the ultraviolet light incident into the display panel becomes stronger, the driving voltage used in the display device may increase. This may have influence on the image quality of the display device. In accordance with the embodiment of the present disclosure, the illuminance sensor 170 senses an amount of ambient light of the display device 100, thereby generating a sensing value SV, and the controller 131 determines an offset value Δv corresponding to the sensing value SV with reference to the driving lookup table CLUT. The voltage generator 160 changes a voltage of at least one of voltages used to drive the display device 100, based on the offset value Δv received from the controller 131.

Meanwhile, when some of the voltages generated by the voltage generator 160 are changed, light generated by each of the pixels PXL of the display panel 110 may be changed, and therefore, the luminance and color coordinate of an image displayed by the display panel 110 may be changed. In accordance with the embodiment of the present disclosure, the controller 131 may differently apply the gamma lookup table GLUT according to the offset value Δv determined by the controller 131. Accordingly, although some of the voltages generated by the voltage generator 160 are changed, a change in color coordinate of an image displayed by the display panel 110 can be minimized.

Figure 2:
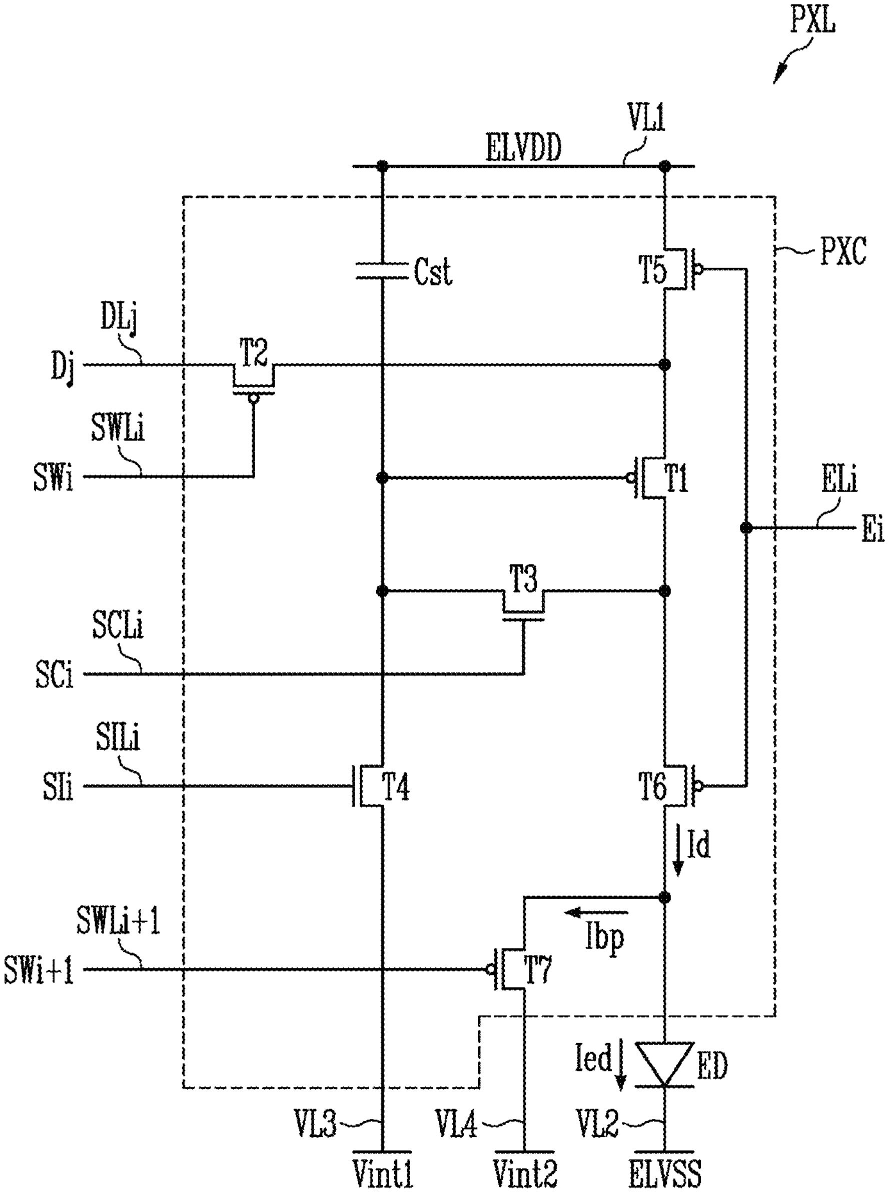
FIG. 2 is an exemplary circuit diagram of a pixel shown in FIG. 1.

FIG. 2 is an exemplary circuit diagram of the pixel shown in FIG. 1.

In FIG. 2, an equivalent circuit diagram of a pixel connected to a j-th data line DLj among the data lines DL1 to DLm shown in FIG. 1, i-th scan lines SILi, SCLi, and SWLi, an (i+1)th scan line SWLi+1 among the scan lines SIL1 to SILn, SCL1 to SCLn, and SWL1 to SWLn shown in FIG. 1, and an i-th emission control line ELi among the emission control lines EL1 to ELn shown in FIG. 1 is exemplarily illustrated.

Referring to FIG. 2, the pixel PXL of the display device in accordance with the embodiment of the present disclosure may include a pixel circuit PXC and at least one light emitting element ED. In an embodiment, the light emitting element ED may be a light emitting diode. In this embodiment, an example, one pixel PXL includes one light emitting element ED is described. The pixel circuit PXC may include first to seventh transistors T1, T2, T3, T4, T5, T6, and T7 and a capacitor Cst.

In the embodiment shown in FIG. 2, the third and fourth transistors T3 and T4 among the first to seventh transistors T1 to T7 may be implemented with an N-type transistor having an oxide semiconductor as a semiconductor layer, and the first, second, fifth, sixth, and seventh transistors T1, T2, T5, T6, and T7 among the first to seventh transistors T1 to T7 may be implemented with a P-type transistor having a low temperature polycrystalline silicon (LTPS) semiconductor layer. However, the present disclosure is not limited thereto, and all the first to seventh transistors T1 to T7 may be implemented with the P-type transistor or the N-type transistor. In another embodiment, at least one of the first to seventh transistors T1 to T7 may be implemented with the N-type transistor, and the others may be implemented with the P-type transistor. In addition, the circuit configuration of the pixel in accordance with the present disclosure is not limited by FIG. 2. The pixel circuit PXC shown in FIG. 2 is merely one example, and the configuration of the pixel circuit PXC may be modified and embodied.

The scan lines SILi, SCLi, SWLi, and SWLi+1 may transfer scan signals SIi, SCi, SWi, and SWi+1, respectively, and the emission control line ELi may transfer an emission control signal Ei. The data line DLj may transfer a data signal Dj. The data signal Dj may have a voltage level corresponding to the voltage value VDATA input to the data driver 133 (see FIG. 1). First to fourth driving voltage lines VL1, VL2, VL3, and VL4 may transfer the first power voltage ELVDD, the second power voltage ELVSS, the first initialization power voltage Vint1, and the second initialization power voltage Vint2, respectively.

The first transistor T1 may include a first electrode connected to the first driving voltage line VL1 via the fifth transistor T5, a second electrode electrically connected to an anode of the light emitting element ED via the sixth transistor T6, and a gate electrode connected to one end of the capacitor Cst. The first transistor T1 may receive the data signal Dj transferred from the data line DLj to supply a driving current Id to the light emitting element ED according to a switching operation of the second transistor T2.

The second transistor T2 may include a first electrode connected to the data line DLj, a second electrode connected to the first electrode of the first transistor T1, and a gate electrode connected to the scan line SWLi. The second transistor T2 may be turned on according to the scan signal SWi transferred through the scan line SWLi, to transfer the data signal Dj transferred from the data line DLj to the first electrode of the first transistor T1.

The third transistor T3 may include a first electrode connected to the gate electrode of the first transistor T1, a second electrode connected to the second electrode of the first transistor T1, and a gate electrode connected to the scan line SCLi. The third transistor T3 may be turned on according to the scan signal SCi transferred through the scan line SCLi, to connect the gate electrode and the second electrode of the first transistor T1 to each other, thereby allowing the first transistor T1 to be diode-connected.

The fourth transistor T4 may include a first electrode connected to the gate electrode of the first transistor T1, a second electrode connected to the third driving voltage line VL3 which transfers the first initialization power voltage Vint1, and a gate electrode connected to the scan line SILi. The fourth transistor T4 may be turned on according to the scan signal SIi transferred through the scan line SILi, to perform an initialization operation of initializing a voltage of the gate electrode of the first transistor T1 by transferring the first initialization power voltage Vint1 to the gate electrode of the first transistor T1.

The fifth transistor T5 may include a first electrode connected to the first driving voltage line VL1, a second electrode connected to the first electrode of the first transistor T1, and a gate electrode connected to the emission control line ELi.

The sixth transistor T6 may include a first electrode connected to the second electrode of the first transistor T1, a second electrode connected to the anode of the light emitting element ED, and a gate electrode connected to the emission control line ELi.

The fifth transistor T5 and the sixth transistor T6 may be simultaneously turned on according to the emission control signal Ei transferred through the emission control line ELi, and accordingly, the first driving power voltage ELVDD is compensated through the diode-connected first transistor T1 to be transferred to the light emitting element ED.

The seventh transistor T7 may include a first electrode connected to the second electrode of the sixth transistor T6, a second electrode connected to the fourth driving voltage line VL4, and a gate electrode connected to the scan line SWLi+1. The seventh transistor T7 may be turned on according to the scan signal SWi+1 transferred through the scan line SWLi+1, to bypass a current of the anode of the light emitting element ED to the fourth driving voltage line VL4.

The one end of the capacitor Cst may be connected to the gate electrode of the first transistor T1 as described above, and the other end of the capacitor Cst may be connected to the first driving voltage line VL1. A cathode of the light emitting element ED may be connected to the second driving voltage line VL2 which transfers the second power voltage ELVSS. The structure of the pixel PXL in accordance with the embodiment of the present disclosure is not limited to the structure shown in FIG. 2, and numbers of transistors and capacitors, which are included in one pixel PXL, and a connection relationship may be variously modified.

As described above, the first high voltage VGH1 may be a voltage for turning off the P-type transistor included in the pixel PXL. The first low voltage VGL1 may be a voltage for turning on the P-type transistor included in the pixel PXL. The second high voltage VGH2 may be a voltage for turning on the N-type transistor included in the pixel PXL. The second low voltage VGL2 may be a voltage for turning off the N-type transistor included in the pixel PXL.

Therefore, the first high voltage VGH1 or the first low voltage VGL1 may be applied to the i-th scan line SWLi, the i-th emission control line ELi, and the (i+1)th scan line SWLi+1. Meanwhile, the second high voltage VGH2 or the second low voltage VGL2 may be applied to the i-th scan lines SCLi and SILi.

Figure 3:
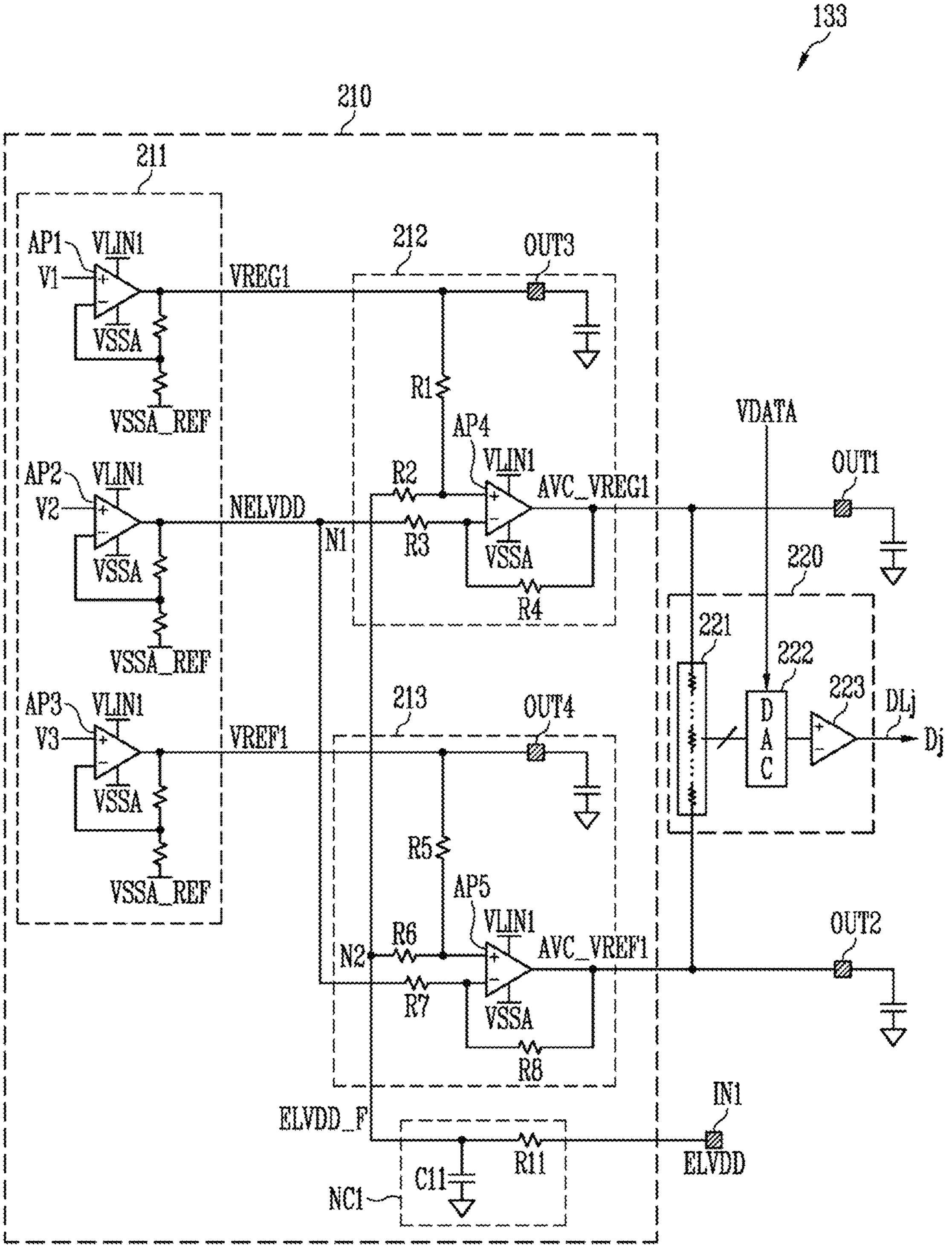
FIG. 3 is an exemplary circuit diagram of a data driver shown in FIG. 1.

FIG. 3 is an exemplary circuit diagram of a data driver shown in FIG. 1.

Referring to FIG. 3, a data driver 200 may include a reference voltage generator 210 and an output circuit 220.

The reference voltage generator 210 may receive the first power voltage ELVDD from the voltage generator 160 shown in FIG. 1, and output a first reference voltage AVC_VREG1 and a second reference voltage AVCVREF1.

The reference voltage generator 210 may include a noise filter NC1, a first voltage generator 211, a second voltage generator 212, and a third voltage generator 213.

The noise filter NC1 may receive the first power voltage ELVDD, and output a filtered power voltage ELVDD_F. The noise filter NC1 may output the filtered power voltage ELVDD_F obtained by removing a low frequency component included in the first power voltage ELVDD.

The noise filter NC1 may include a resistor R11 and a capacitor C11. The resistor R11 may be connected between an input terminal IN1 and a second node N2. The capacitor C11 may be connected between the second node N2 and a ground terminal. The second node N2 may be an output node at which the filtered power voltage ELVDD_F is output. A cut-off frequency of the noise filter NC1 may be determined according to a resistance value of the resistor R11 and a capacitance of the capacitor C11. The circuit configuration of the noise filter NC1 is not limited by FIG. 3, and may be variously changed.

The first voltage generator 211 may receive voltages V1, V2, V3, VLIN1, VSSA, and VSSA_REF, and output a first voltage VREG1, a second voltage NELVDD, and a third voltage VREF1. The first voltage generator 211 may include operational amplifiers AP1, AP2, and AP3. The operational amplifiers AP1, AP2, and AP3 may output the first voltage VREG1, the second voltage NELVDD, and the third voltage VREF1, respectively. In an embodiment, the first voltage VREG1, the second voltage NELVDD, and the third voltage VREF1 may have different voltage levels. In an embodiment, the first voltage VREG1, the second voltage NELVDD, and the third voltage VREF1 may have a relationship of VREG1>NELVDD>VREF1. In an embodiment, the second voltage NELVDD output from the operational amplifier AP2 may have the same voltage level as the first power voltage ELVDD. The voltage VLIN1 may be a driving voltage input to the operational amplifiers AP1, AP2, and AP3. The first voltage VREG1, the second voltage NELVDD, and the third voltage VREF1 may be output to a third output terminal OUT3, a first node N1, and a fourth output terminal OUT, respectively. The circuit configuration of the first voltage generator 211 is not limited by FIG. 3, and may be variously changed.

The second voltage generator 212 may receive the first voltage VREG1, the second voltage NELVDD, and the filtered power voltage ELVDD_F, and output the first reference voltage AVC_VREG1. The first reference voltage AVC_VREG1 may be output to a first output terminal OUT1.

The second voltage generator 212 may include resistors R1, R2, R3, and R4 and an operational amplifier AP4. The resistor R1 may be connected between the third output terminal OUT3 and a first input terminal (+) of the operational amplifier AP4. The resistor R2 may be connected between the first input terminal (+) of the operational amplifier AP4 and the second node N2. The resistor R3 may be connected between the first node N1 and a second input terminal (−) of the operational amplifier AP4. The resistor R4 may be connected between the second input terminal (−) of the operational amplifier AP4 and the first output terminal OUT1.

The first reference voltage AVC_VREG1 output from the second voltage generator 212 may be calculated by the following Equation 1

$$\mathrm{AVC\_VREG1} = (\mathrm{ELVDD\_F} - NELVDD) + VREG1 \qquad \text{Equation 1}$$

The circuit configuration of the second voltage generator 212 is not limited by FIG. 3, and may be variously changed.

The third voltage generator 213 may receive the second voltage NELVDD, the third voltage VREF1, and the filtered power voltage ELVDD_F, and output the second reference voltage AVC_VREF1. The second reference voltage AVC_VREF1 may be output to a second output terminal OUT2.

The third voltage generator 213 may include resistors R5, R6, R7, and R8 and an operational amplifier AP5. The resistor R5 may be connected between the fourth output terminal OUT4 and a first input terminal (+) of the operational amplifier AP5. The resistor R6 may be connected between the first input terminal (+) of the operational amplifier AP5 and the second node N2. The resistor R7 may be connected between the first node N1 and a second input terminal (−) of the operational amplifier AP5. The resistor R8 may be connected between the second input terminal (−) of the operational amplifier AP5 and the second output terminal OUT2.

The second reference voltage AVC_VREF output from the third voltage generator 213 may be calculated by the following Equation 2.

$$AVC\_VREF1 = (ELVDD\_F - NELVDD) + VREF1 \quad \text{Equation 2}$$

The circuit configuration of the third voltage generator 213 is not limited by FIG. 3, and may be variously changed.

The output circuit 220 may output, to a j-th data line DLj, a data signal Dj having a voltage level corresponding to a voltage value VDATA, based on the first reference voltage AVC_VREG1 and the second reference voltage AVC_VREF1.

The output circuit 220 may include a resistor string 221, a digital-analog converter 222, and a buffer 223. The resistor string 221 may include a plurality of resistors connected between the first output terminal OUT1 and the second output terminal OUT2. Although not shown in the drawing, the resistor string 221 may output, as gamma reference voltages, voltages of connection nodes between the plurality of resistors.

The digital-analog converter 222 may receive a voltage value VDATA from the data converter 132 shown in FIG. 1. The digital-analog converter 222 may output a data signal Dj corresponding to a voltage value VDATA corresponding to the j-th data line DLj among a plurality of gamma reference voltages from the resistor string 221. The buffer 223 may output the data signal Dj from the digital-analog converter 222 to the j-th data line DLj.

In FIG. 3, only a case where the output circuit 220 outputs the data signal Dj to the j-th data line DLj is illustrated as an example. The output circuit 220 may drive all the data lines DL1 to DLm shown in FIG. 1, using the same method as a method of driving the j-th data line DLj.

As described above, a voltage level of the data signal Dj output from the output circuit 220 corresponds to the voltage value VDATA. However, the voltage level of the data signal Dj may vary according to voltage levels of the first reference voltage AVC_VREFG1 and the second reference voltage AVC_VREF1.

Figure 4:
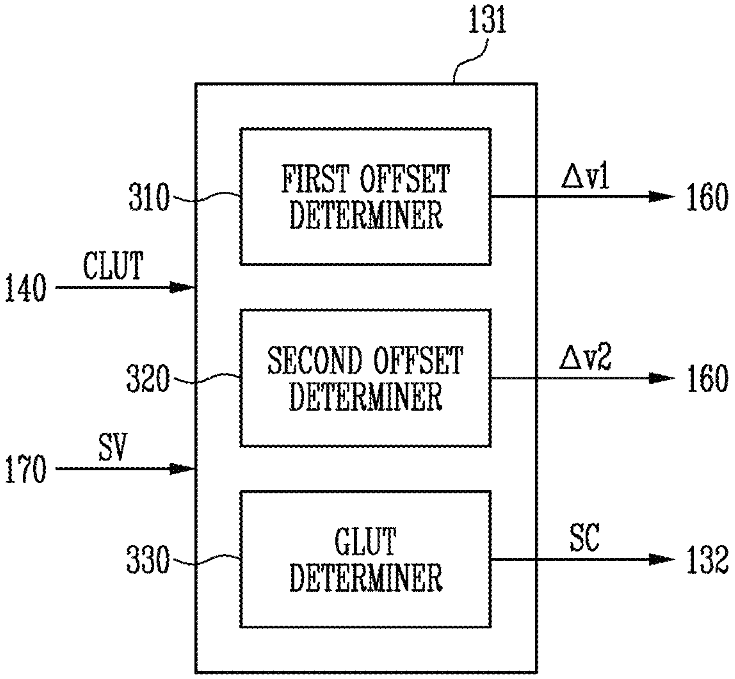
FIG. 4 is a block diagram illustrating an embodiment of a controller shown in FIG. 1.

FIG. 4 is a block diagram illustrating an embodiment of the controller shown in FIG. 1.

Referring to FIG. 4, the controller 131 may include a first offset determiner 310, a second offset determiner 320, and a gamma lookup table ("GLUT") determiner 330. The controller 131 may receive a driving lookup table CLUT from the memory 140. Also, the controller 131 may receive a sensing value SV from the illuminance sensor 170.

The first offset determiner 310 may determine a first offset value Δv1, based on the received driving lookup table CLUT and the received sensing value SV. The determined first offset value Δv1 may be transferred to the voltage generator 160.

The second offset determiner 320 may determine a second offset value Δv2, based on the received driving lookup table CLUT and the received sensing value SV. The determined second offset value Δv2 may be transferred to the voltage generator 160.

The GLUT determiner 330 may generate a control signal SC, based on the received driving lookup table CLUT and the received sensing value SV. The control signal SC may be a signal for determining a gamma lookup table GLUT which the data converter 132 is to use. The control signal SC may be transferred to the data converter 132. The data converter 132 may receive, from the memory 140, a gamma lookup table GLUT used to generate a voltage value VDATA, based on the control signal SC.

The following Table 1 illustrates an exemplary embodiment of the driving lookup table CLUT stored in the memory 140.

TABLE 1

| SV (Lux) | ΔV1 (V) | ΔV1 (V) | GLUT |
|---|---|---|---|
| Less than 500 | 0 | 0 | GLUT1 |
| 500~3800 | −0.2 | 0 | GLUT2 |
| 3800~4500 | −0.3 | 0 | GLUT3 |
| 4500~5000 | −0.4 | 0 | GLUT4 |
| 5000~40000 | −0.5 | −0.1 | GLUT5 |
| 40000~75000 | −0.6 | −0.2 | GLUT6 |
| 75000~88000 | −0.7 | −0.3 | GLUT7 |
| 88000~100000 | −0.8 | −0.4 | GLUT8 |
| 100000 or more | −0.9 | −0.5 | GLUT9 |

Referring to Table 1, as the illuminance at the outside of the display device 100 becomes stronger, the absolute value of the first offset value Δv1 may become larger. At an illuminance of 500 Lux or more, the first offset value Δv1 may have a negative value. In addition, as the illuminance at the outside of the display device 100 becomes stronger, the absolute value of the second offset value Δv2 may become larger. At an illuminance of 500 Lux or more, the second offset value Δv2 may have a negative value.

That is, in at least a partial illuminance section, the first offset value Δv1 or the second offset value Δv2 may have a negative value. As the illuminance at the outside of the display device 100 becomes stronger, the absolute value of the first offset value Δv1 or the second offset value Δv2 may increase.

Meanwhile, according to each illuminance range, the GLUT determiner 330 may determine a gamma lookup table GLUT which the data converter 132 is to use. Meanwhile, the GLUT determiner 330 may transfer the control signal representing the determined gamma lookup table GLUT to the data converter 132.

For example, when the sensing value sensed by the illuminance sensor 170 represents 60000 Lux, the first offset determiner 310 may determine −0.6V as the first offset value Δv1, and the second offset determiner 320 may determine −0.2V as the second offset value Δv2. The GLUT determiner 330 may determine a sixth gamma lookup table GLUT6 as the gamma lookup table GLUT which the data converter 132 is to use. The GLUT determiner 330 may transfer the control signal SC representing the sixth gamma lookup table GLUT6 to the data converter 132.

Figure 5:
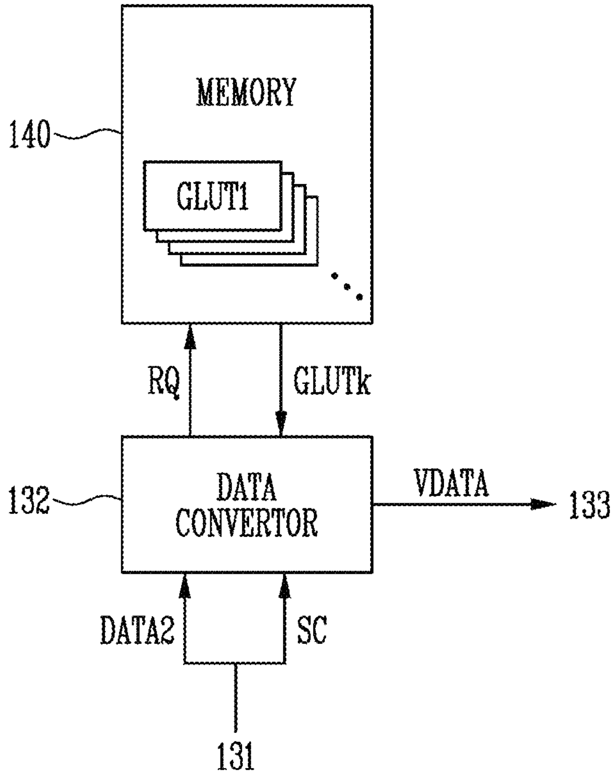
FIG. 5 is a block diagram illustrating an operation of a data converter shown in FIG. 1.

FIG. 5 is a block diagram illustrating an operation of the data converter shown in FIG. 1.

Referring to FIG. 5, the data converter 132 may receive image data DATA2 and a control signal SC from the controller 131.

Meanwhile, the memory 140 may include a plurality of gamma lookup tables GLUT1, . . . . The number of the gamma lookup tables GLUT1, . . . stored in the memory 140 may correspond to the number of sections of an illuminance range included in the driving lookup table CLUT. For example, when the driving lookup table CLUT is configured as shown in Table 1, the memory 140 may include first to ninth gamma lookup tables GLUT1 to GLUT9.

As described above, the control signal SC may be a signal representing a gamma lookup table GLUT which the data converter 132 is to use. The data converter 132 may transfer a request signal RQ for requesting a kth gamma lookup table GLUTk to the memory 140 in response to the control signal SC. The memory 140 may transfer the kth gamma lookup table GLUTk to the data converter 132 in response to the request signal RQ.

For example, when the GLUT determiner 330 shown in FIG. 4 transfers a control signal SC representing the sixth gamma lookup table GLUT6 to the data converter 132, the data converter 132 may transfer a request signal RQ for requesting the sixth gamma lookup table GLUT6 to the memory 140 in response to the control signal SC. Meanwhile, the memory 140 may transfer the sixth gamma lookup table GLUT6 to the data converter 132 in response to the request signal RQ. The data converter 132 may generate a voltage value VDATA from the image data DATA2, using the sixth gamma lookup table GLUT6. The generated voltage value VDATA may be transferred to the data driver 133.

Figure 6A:
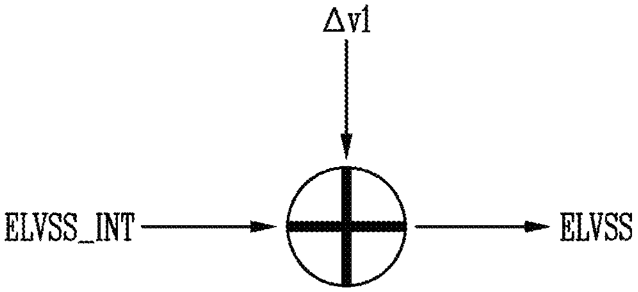
FIGS. 6A and 6B are diagrams each illustrating a method of changing a second power voltage ELVSS and a first low voltage VGL1, using a first offset value Δv1.
Figure 6B:
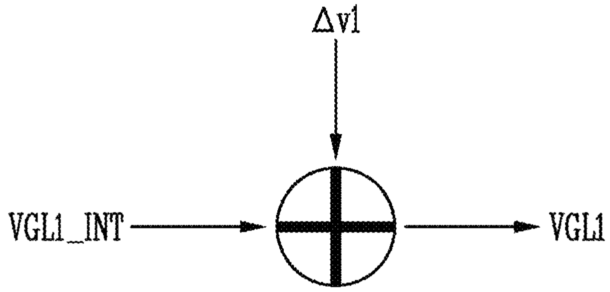
Figure 7A:
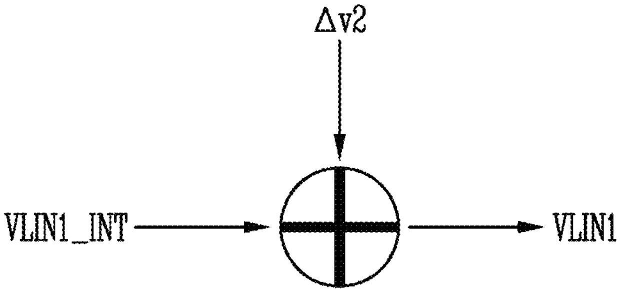
FIGS. 7A and 7B are diagrams each illustrating a method of changing a voltage VLIN1 and a first high voltage VGH1, using a second offset value Δv2.
Figure 7B:
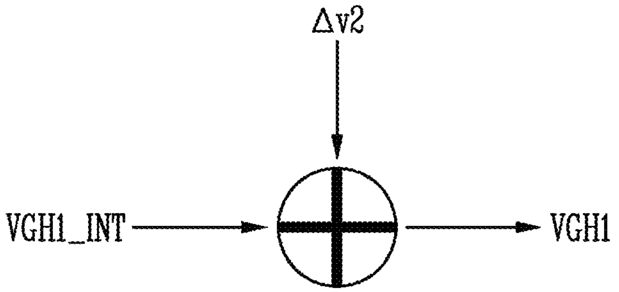

FIGS. 6A and 6B are diagrams each illustrating a method of changing the second power voltage ELVSS and the first low voltage VGL1, using the first offset value Δv1. FIGS. 7A and 7B are diagrams each illustrating a method of changing the voltage VLIN1 and the first high voltage VGH1, using the second offset value Δv2.

Referring to FIG. 6A, the voltage generator 160 may generate the second power voltage ELVSS by adding the first offset value Δv1 to an initial second power voltage ELVSS_INT. As described above, as the illuminance at the outside (i.e., ambient light) of the display device 100 becomes stronger, the absolute value of the first offset value Δv1 having a negative value may become larger. Therefore, as the illuminance at the outside of the display device 100 becomes stronger, the second power voltage ELVSS may decrease.

Referring to FIG. 6B, the voltage generator 160 may generate the first low voltage VGL1 by adding the first offset value Δv1 to an initial first low voltage VGL1_INT. Like the second power voltage ELVSS, as the illuminance at the outside (i.e., ambient light) of the display device 100 becomes stronger, the first low voltage VGL1 may decrease.

Although not shown in FIGS. 6A and 6B, the second low voltage VGL2 may also be changed by the first offset value Δv1, using a method similar to that shown in FIG. 6A or 6B.

Referring to FIG. 7A, the voltage generator 160 may generate the voltage VLIN1 by adding the second offset value Δv2 to an initial voltage VLIN1_INT. As described above with reference to FIG. 3, the voltage VLIN1 may be a driving voltage input to the operational amplifiers AP1, AP2, and AP3 included in the data driver 133. That is, the driving voltage VLIN1 of the operational amplifiers AP1, AP2, and AP3 included in the data driver 133 may be changed by the second offset value Δv2. In addition, as the illuminance at the outside (i.e., ambient light) of the display device 100 becomes stronger, the absolute value of the second offset value Δv2 having a negative value may become larger. Therefore, as the illuminance at the outside (i.e., ambient light) of the display device 100 becomes stronger, the driving voltage VLIN1 of the operational amplifiers AP1, AP2, and AP3 included in the data driver 133 may decrease.

Referring to FIG. 7B, the voltage generator 160 may generate the first high voltage VGH1 by adding the second offset value Δv2 to an initial first high voltage VGH1_INT. Like the voltage VLIN1, as the illuminance at the outside (i.e., ambient light) of the display device 100 becomes stronger, the magnitude of the second high voltage VGH1 may decrease.

Although not shown in FIGS. 7A and 7B, the second high voltage VGH2 and the voltage AVC_VREF1 may also be changed by the second offset value Δv2, using a method similar to that shown in FIG. 7A or 7B.

Figure 8:
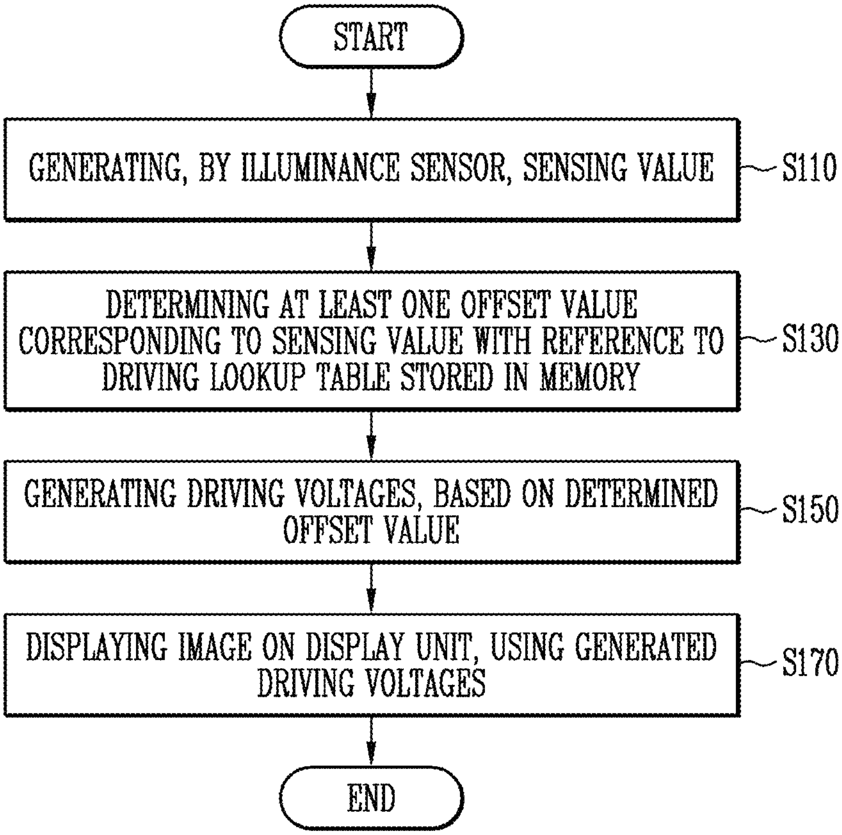
FIG. 8 is a flowchart illustrating a method of driving the display device in accordance with an embodiment of the present disclosure.

FIG. 8 is a flowchart illustrating a method of driving the display device in accordance with an embodiment of the present disclosure.

Referring to FIG. 8, the method of driving the display device may include step S110 of generating, by an illuminance sensor, a sensing value, step S130 of determining at least one offset value corresponding to the sensing value with reference to a driving lookup table stored in a memory, step S150 of generating driving voltages, based on the determined offset value, and step S170 of displaying an image on the display unit, using the generated driving voltages. Hereinafter, the flowchart shown in FIG. 8 will be described with reference to FIG. 1 together.

In step S110, the illuminance sensor 170 of the display device 100 may sense an external illuminance and generate a sensing value SV corresponding to the external illuminance. The generated sensing value SV may be transferred to the controller 131.

In the step S130, the memory 140 may transfer a driving lookup table CLUT to the controller 131. The controller 131 may determine an offset value Δv corresponding to the sensing value SV with reference to the driving lookup table CLUT. The offset value Δv may include at least one of a first offset value Δv1 and a second offset value Δv2. As the sensing value generated in the step S110 indicates a higher illuminance, the offset value Δv determined in the step S130 may become smaller.

In the step S150, the controller 131 may transfer the determined offset value Δv to the voltage generator 160. The voltage generator 160 may change and generate a value of at least one of driving voltages generated to drive the display device, using the received offset value Δv. As the sensing value generated in the step S110 indicates a higher illuminance, a voltage to be changed may become smaller.

In the step S170, the voltage generator 160 may transfer the changed driving voltage to other components of the display device. Accordingly, the display device may display an image on the display unit 110, using the changed driving voltage.

Figure 9:
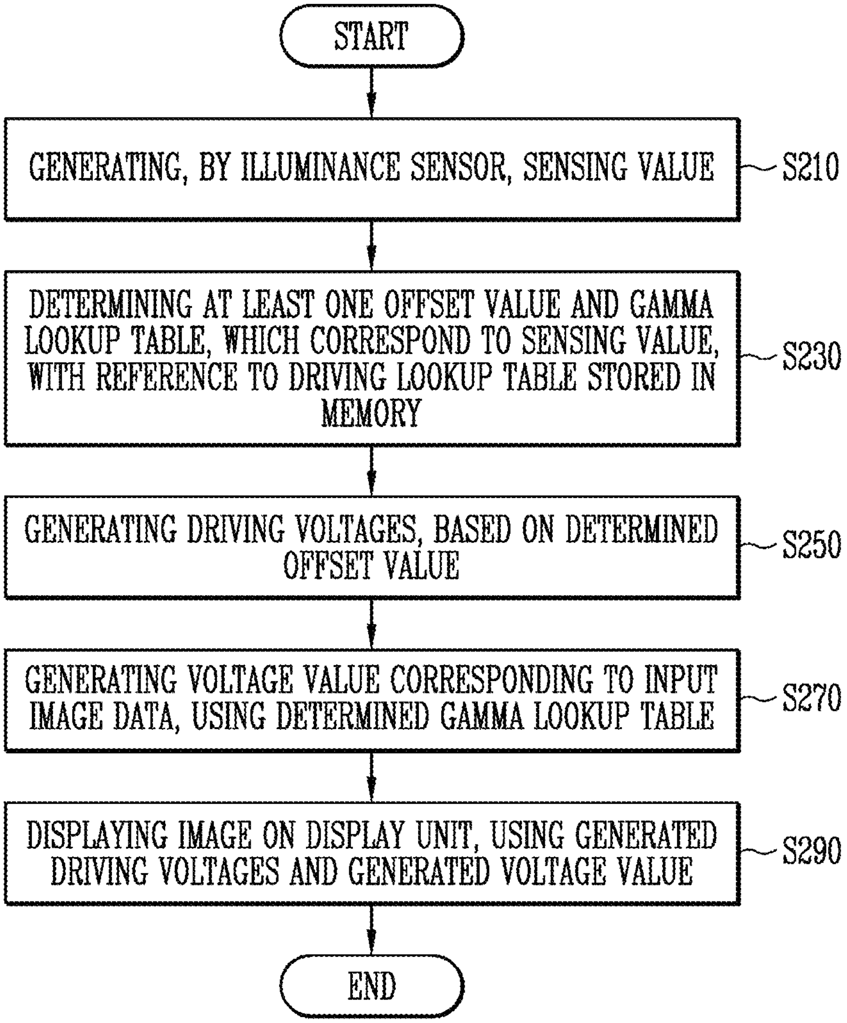
FIG. 9 is a flowchart illustrating a method of driving the display device in accordance with another embodiment of the present disclosure.

FIG. 9 is a flowchart illustrating a method of driving the display device in accordance with another embodiment of the present disclosure.

Referring to FIG. 9, the method of driving the display device may include step S210 of generating, by an illuminance sensor, a sensing value, step S230 of determining at least one offset value and a gamma lookup table, which correspond to the sensing value, with reference to a driving lookup table stored in a memory, step S250 of generating driving voltages, based on the determined offset value, step S270 of generating a voltage value corresponding to input image data, using the determined gamma lookup table, and step S290 of displaying an image on a display unit, using the generated driving voltages and the generated voltage value. Hereinafter, the flowchart shown in FIG. 9 will be described with reference to FIG. 1 together.

In the step S210, the illuminance sensor 170 of the display device 100 may sense an external illuminance and generate a sensing value SV corresponding to the external illuminance. The generated sensing value SV may be transferred to the controller 131.

In the step S230, the memory 140 may transfer a driving lookup table CLUT to the controller 131. The controller 131 may determine an offset value Δv corresponding to the sensing value SV with reference to the driving lookup table CLUT. The offset value Δv may include at least one of a first offset value Δv1 and a second offset value Δv2. As the sensing value generated in the step S210 indicates a higher illuminance, the offset value Δv determined in the step S230 may become smaller.

Meanwhile, in the step S230, the controller 131 may determine a gamma lookup table which the data converter 132 is to use among a plurality of gamma lookup tables with reference to the driving lookup table CLUT. The controller 131 may transfer, to the data converter 132, a control signal SC corresponding to the determined gamma lookup table.

In the step S250, the controller 131 may transfer the determined offset value Δv to the voltage generator 160. The voltage generator 160 may change and generate a value of at least one of driving voltages generated to drive the display device, using the received offset value Δv. As the sensing value generated in the step S110 indicates a higher illuminance, a voltage to be changed may become smaller.

In the step S270, the data converter 132 may transfer, to the memory 140, a request RQ corresponding to the received control signal SC. The memory 140 may transfer, to the data converter 132, a gamma lookup table GRUT corresponding to the request RQ. The data converter 132 may generate a voltage value VDATA corresponding to image data DATA2, using the received gamma lookup table GRUT. The generated voltage value VDATA may be transferred to the data driver 133.

In the step S290, the voltage generator 160 may transfer the changed driving voltage to other components of the display device. Also, in the step S290, the data driver 133 may transfer a data signal according to the generated voltage value VDATA to the display unit 110. Accordingly, the display device may display an image on the display unit 110, using the changed driving voltage.

In the display device and the method of driving the display device in accordance with the present disclosure, a driving voltage changed according to external illuminance can be compensated.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a display panel including a pixel;

a voltage generator configured to generate a plurality of driving voltages;

an illuminance sensor configured to sense an amount of ambient light of the display panel, and generate a sensing value corresponding to a sensing result;

a driver configured to generate a data signal transferred to the pixel; and a memory configured to store a driving lookup table, wherein the driver controls the voltage generator to change at least one driving voltage among the plurality of driving voltages, based on the sensing value, wherein the driver includes a controller configured to generate a first offset value corresponding to the sensing value with reference to the driving lookup table, and provide the first offset value to the voltage generator.

2. The display device of claim 1, wherein the pixel includes:

a pixel circuit connected to a line configured to supply a first power voltage; and a light emitting element connected between the pixel circuit and a line configured to supply a second power voltage, and wherein the voltage generator generates the second power voltage, using the first offset value.

3. The display device of claim 2, wherein the voltage generator generates the second power voltage by adding the first offset value to an initial second power voltage.

4. The display device of claim 3, wherein the pixel circuit includes at least one P-type transistor, and wherein the voltage generator generates a voltage supplied to a gate of the at least one P-type transistor and for turning on the at least one P-type transistor, using the first offset value.

5. The display device of claim 3, wherein the pixel circuit includes at least one N-type transistor, and wherein the voltage generator generates a voltage supplied to a gate of the at least one N-type transistor and for turning off the at least one N-type transistor, using the first offset value.

6. The display device of claim 1, wherein the controller receives first image data, and generates second image data, based on the first image data, wherein the driver further includes:

a data converter configured to receive the second image data, and generate a voltage value corresponding to the second image data; and a data driver connected to the pixel through a data line, the data driver generating the data signal, which corresponds to the voltage value, and supplying the generated data signal to the data line, and wherein the controller generates a second offset value corresponding to the sensing value with reference to the driving lookup table, and provides the second offset value to the voltage generator.

7. The display device of claim 6, wherein the pixel includes:

a pixel circuit connected to a line configured to supply a first power voltage; and a light emitting element connected between the pixel circuit and a line configured to supply a second power voltage, wherein the pixel circuit includes at least one N-type transistor, and wherein the voltage generator generates a voltage supplied to a gate of the at least one N-type transistor and for turning on the at least one N-type transistor, using the second offset value.

8. The display device of claim 6, wherein the pixel includes:

a pixel circuit connected to a line configured to supply a first power voltage; and a light emitting element connected between the pixel circuit and a line configured to supply a second power voltage, wherein the pixel circuit includes at least one P-type transistor, and wherein the voltage generator generates a voltage supplied to a gate of the at least one P-type transistor and for turning off the at least one P-type transistor, using the second offset value.

9. The display device of claim 6, wherein the voltage generator generates a driving voltage of an operational amplifier included in the data driver, using the second offset value.

10. The display device of claim 6, wherein the memory further stores a plurality of gamma lookup tables, and wherein the data converter generates the voltage value, using a gamma lookup table corresponding to the sensing value among the plurality of gamma lookup tables.

11. A method of driving a display device, the method comprising:

generating, by an illuminance sensor, a sensing value of illuminance of ambient light of the display device;

determining at least one offset value corresponding to the sensing value with reference to a driving lookup table;

generating at least one driving voltage, based on the offset value; and displaying an image, using the driving voltage, wherein the generating of the at least one driving voltage, based on the offset value, includes generating a power voltage supplied to a cathode of a light emitting element in a pixel of the display device, based on the offset value.

12. The method of claim 11, wherein, in the generating of the at least one driving voltage, a smaller voltage as the driving voltage is generated as the sensing value indicates a higher illuminance.

13. The method of claim 11, wherein the generating of the at least one driving voltage, based on the offset value, includes generating a voltage supplied to a gate of a P-type transistor included in a pixel of the display device, based on the offset value.

14. The method of claim 11, wherein the generating of the at least one driving voltage, based on the offset value, includes generating a voltage supplied to a gate of an N-type transistor included in a pixel of the display device, based on the offset value.

15. The method of claim 11, wherein the generating of the at least one driving voltage, based on the offset value, includes generating a driving voltage of an operational amplifier included in a data driver configured to generate a data signal to be supplied to a data line connected to a pixel of the display device, based on the offset value.

16. A method of driving a display device, the method comprising:

generating, by an illuminance sensor, a sensing value of illuminance of ambient light of the display device;

determining at least one offset value and a gamma lookup table, which correspond to the sensing value, with reference to a driving lookup table;

generating at least one driving voltage, based on the offset value;

generating a voltage value corresponding to input image data, using the gamma lookup table; and displaying an image, using the driving voltage and the voltage value, wherein the generating of the at least one driving voltage, based on the offset value, includes generating a power voltage supplied to a cathode of a light emitting element in a pixel of the display device, based on the offset value.

17. The method of claim 16, wherein, in the generating of the at least one driving voltage, a smaller voltage as the driving voltage is generated as the sensing value indicates a higher illuminance.

* * * * *